H. U. ROGNESS.
AUTOMOBILE FRAME.
APPLICATION FILED MAR. 8, 1913.
1,116,123.
Patented Nov. 3, 1914.
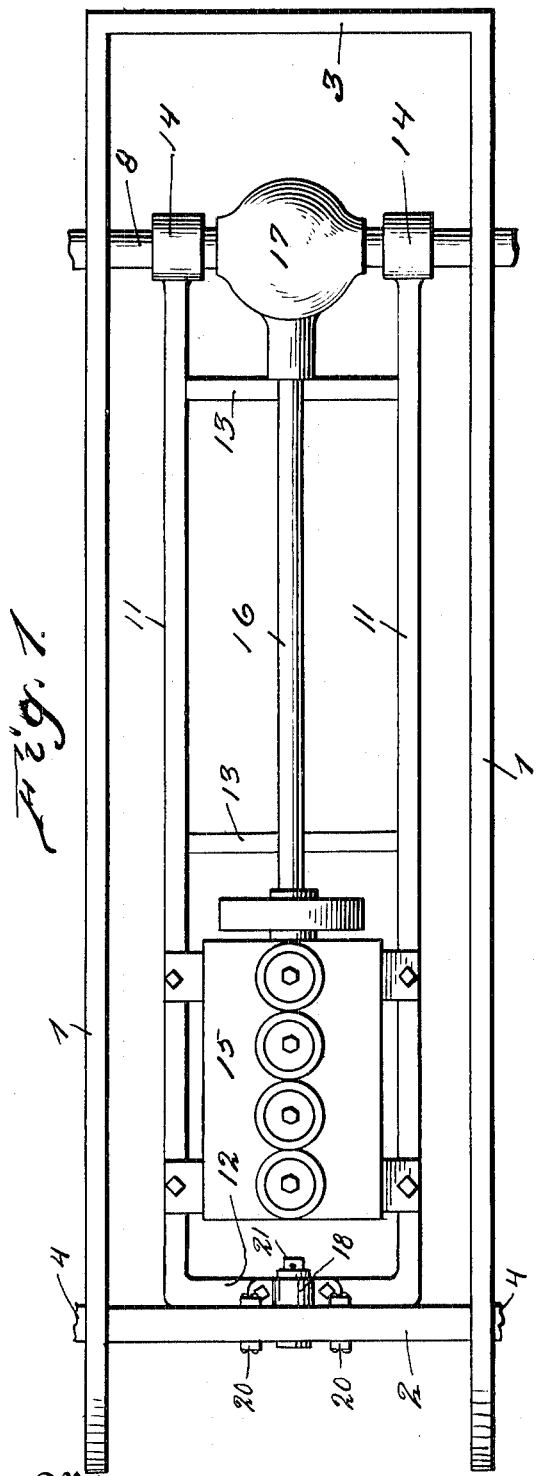
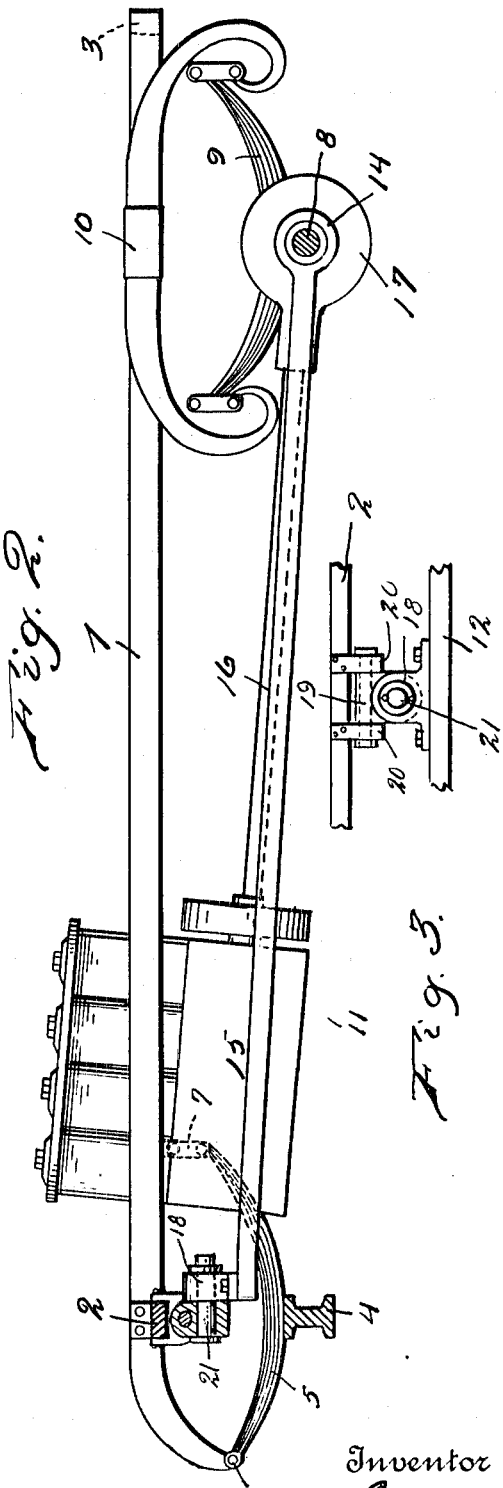

UNITED STATES PATENT OFFICE.

HELGE U. ROGNESS, OF SIOUX FALLS, SOUTH DAKOTA.

AUTOMOBILE-FRAME.

1,116,123.     Specification of Letters Patent.     Patented Nov. 3, 1914.

Application filed March 8, 1913. Serial No. 752,939.

*To all whom it may concern:*

Be it known that I, HELGE U. ROGNESS, a citizen of the United States, residing at Sioux Falls, in the county of Minnehaha and State of South Dakota, have invented certain new and useful Improvements in Automobile-Frames, of which the following is a specification.

My invention relates to automobile frames, and particularly to the construction of a sub-frame pivotally connected with a main frame.

The object of the invention is to provide a sub-frame supported upon the rear axle and pivotally connected with the main frame at its forward end in such a manner as to insure a substantially rigid relation between the main frame and the sub-frame.

An important object is to provide a sub-frame connected with the rear axle and so connected with the main frame at its forward end that all changes in alinement of the shaft of the engine mounted on the sub-frame, caused by torsion, will be taken up or compensated for thus avoiding the use of a universal joint in the transmission shaft.

A further object is to suspend the sub-frame from the front springs, and the rear axle to form a practically non-changing support for the engine, thus securing the rear axle firmly to the frame without the use of brace or radius rods.

Another object is to construct the frames in such manner that the rear wheels will exert a positive pull, and that there will be no loss of power through joints, springs, and universal joints.

Another object is to provide a frame comprising a main frame and a sub-frame quickly and easily detachable therefrom.

Other objects and advantages will become apparent during the course of the following description.

Referring to the drawings forming a part of this specification, and in which like numerals are employed to designate corresponding parts throughout the several views:

Figure 1 is a top plan view of my improved frame, Fig. 2 is a vertical sectional view, and Fig. 3 is a detail sectional view.

Referring more particularly to the drawings, the numeral 1 designates the side bars of the body frame, and 2 and 3 designate the front and rear cross-bars respectively. The front axle 4 is disposed directly under the cross piece 2 and has mounted thereon springs 5 connected with the side bars 1 at their forward ends as shown at 6. The rear extremities of the springs 5 are connected with the side bars 1 by means of the usual links 7.

The rear axle 8 has mounted thereon springs 9 connected with the side bars 1 by means of the usual clips 10.

My sub-frame comprises side bars 11, a front head or cross piece 12, and transverse braces 13. The side bars 11 terminate in sleeves 14 surrounding the rear axle casing. The engine 15 is secured upon the sub-frame in any desired manner, and has its shaft 16 extending rearwardly into the transmission box 17, as is customary.

Secured to, or formed integrally with the front head or cross piece 12 of the sub-frame is a bracket 18. The cross piece 2 of the main frame is provided with a central block 19, which is pivoted between arms or hangers 20. The bracket 18 and block 19 are detachably connected by means of a king-bolt or pin 21.

It will thus be seen that by virtue of the revoluble connection made by means of the bolt or pin 21, lateral torsion of the sub-frame is allowed for, and the danger of twisting the frame is obviated.

In case the vehicle strikes a rut, depression or obstruction, which causes the main frame to move vertically in relation to the axle 4, the sub-frame will move in the same way, as it has a fixed relation with the cross piece 2 of the main frame. This is essential, as the engine 15 is mounted on the sub-frame and the radiator hood and other parts are mounted on the main frame. If the main and sub-frames did not remain in the same position relative to each other, the various connections such as hose, tubing, etc., would be broken, and the hood would be battered and displaced. At the same time this structure allows the weight of the engine and its associated parts to be borne by the front springs, and resiliently supported by the front axle.

As the sub-frame is pivoted upon the rear axle 8, and the main frame is supported on springs, the main frame can move independently of the sub-frame, but there is a small movement of the sub-frame at the point of connection with the cross piece 2. By connecting the bracket 18 with the block 19 which is horizontally pivoted between the arms or hangers 20 this slight movement is allowed, and there is no danger of displacing the parts.

Furthermore, the side bars 11 of the sub-frame serve to rigidly secure the rear axle in its proper position without the need of braces or radius rods.

From the foregoing it will be obvious that universal joints in the drive shaft 16 may be dispensed with, as the shaft 16 will be maintained in substantially perfect alinement at all times.

It will be observed that by removing the pin 21 the sub-frame will be disconnected at its forward end. The sub-frame may then be lowered to the floor and the main frame supporting the body may be tilted up by any suitable means. This allows very ready access to the engine and its associated parts.

Having thus described my invention what I claim is:

1. An automobile frame comprising a main frame mounted on springs secured upon the front and rear axles, a sub-frame connected with the rear axle, a bracket rigidly mounted on the forward end of the sub-frame, said bracket having a transverse central aperture, a pair of spaced depending arms rigidly secured upon the main frame, said arms having apertures in their lower portions, a bolt in said apertures, a block on said bolt between said arms to allow a longitudinal movement of the sub-frame, and a removable bolt extending through and revolubly connecting said bracket and said block to permit of sidewise movement of said sub-frame.

2. An automobile frame comprising a main frame mounted on springs secured upon the front and rear axles, a sub-frame pivotally connected with the rear axle and inclined upwardly toward its forward end, an upstanding bracket rigidly secured upon the forward end of the sub-frame and provided with a cylindrical opening parallel with the axis of the frame, a pair of spaced depending arms rigidly connected with the main frame and provided with cylindrical openings extending transversely of the axis of the car, a block disposed between said depending arms and pivoted thereto by a bolt extending through the openings in said arms and provided with a cylindrical opening in alinement with said first named opening, and a king bolt extending through said openings in said bracket and said block.

3. An automobile frame comprising a main frame mounted on springs secured upon the front and rear axles and a sub-frame pivotally connected with said rear axle, a bracket rigidly secured upon the forward end of said sub-frame, hangers rigidly secured to said main frame in a vertical line with said front axle, a block secured between said hangers, a bolt connecting said bracket and said hangers, and means on said sub-frame for rigidly supporting the engine and drive shaft.

In testimony whereof I hereunto affix my signature in the presence of two witnesses.

HELGE U. ROGNESS.

Witnesses:
LOUIS CAILLO,
THOS. McLINNON.